United States Patent [19]

Johnson et al.

[11] 4,047,192
[45] Sept. 6, 1977

[54] PHOTOGRAPHIC APPARATUS WITH SEQUENCING SYSTEM

[75] Inventors: Bruce K. Johnson, Andover; David E. Van Allen, Malden; George D. Whiteside, Lexington, all of Mass.

[73] Assignee: Polaroid Corporation, Cambridge, Mass.

[21] Appl. No.: 554,777

[22] Filed: Mar. 3, 1975

[51] Int. Cl.² .............................................. G03B 17/50
[52] U.S. Cl. ....................................... 354/83; 354/86; 354/173; 354/213
[58] Field of Search ............................... 354/83–86, 354/170, 171, 173, 174, 180, 202, 203, 212, 213, 215, 217, 288, 234

[56] References Cited

U.S. PATENT DOCUMENTS

| | | | |
|---|---|---|---|
| 3,468,228 | 9/1969 | Rogers | 354/234 |
| 3,470,803 | 10/1969 | Fukuoka et al. | 354/173 |
| 3,492,931 | 2/1970 | Racki | 354/234 |
| 3,645,190 | 2/1972 | Sohn | 354/234 |
| 3,683,771 | 8/1972 | Land | 354/304 X |
| 3,731,608 | 5/1973 | Shenk | 354/86 |
| 3,744,388 | 7/1973 | Erlichman | 354/86 |
| 3,760,701 | 9/1973 | Daglia | 354/83 X |
| 3,882,515 | 5/1975 | Mueller | 354/204 X |
| 3,893,142 | 7/1975 | Cirai | 354/204 |

Primary Examiner—Monroe H. Hayes
Attorney, Agent, or Firm—David R. Thornton

[57] ABSTRACT

A photographic apparatus including a "sequencing system" for initiating and controlling the orderly performance of functions in a cycle of apparatus operation that includes the exposing and processing of a self-developing film unit. The "sequencing system" includes a sequencing gear which makes a single revolution during the operating cycle and preferably initiates, controls and/or performs the function of selectively latching and unlatching a shutter, operating an electrical power switch, operating a film advance device and indexing a film counting device.

52 Claims, 10 Drawing Figures

PHOTOGRAPHIC APPARATUS WITH SEQUENCING SYSTEM

BACKGROUND OF THE INVENTION

1. Field of the Invention

The present invention relates to the field of photography and, more particularly, to photographic apparatus for exposing and processing "self-developing" film units.

2. Description of the Prior Art

The current state of the art in "one-step photographic systems" features integral or "nonpeel-apart film units" and highly automated cameras for exposing and processing these film units.

In a typical system, the film units are held in a film container which also includes a battery for powering electrical systems of the camers. Once the film container is loaded in the camera, the user frames the subject to be photographed, focuses the optical system, and presses a button to initiate a cycle of camera operation.

If the camera is of the single lens reflex type, the operating cycle consists of converting the optical system from the viewing mode to an exposure mode; exposing the forwardmost film unit in the film container; advancing the exposed film unit from the container to a processing station where a compressive pressure is applied to distribute a fluid processing composition within the film unit, thereby initiating a development and diffusion transfer processes; ejecting the processed film unit, at least partially, from the camera; and resetting the camera mechanisms for the next cycle of camera operation. The complete cycle of operation may occur in as little as 1.5 seconds.

In nonreflex cameras, the step of converting the optical system from the viewing and focusing mode to the exposure mode, and the subsequent reset of this subsystem, is, of course, unnecessary.

The present invention relates to camera mechanisms and/or systems for initiating, controlling, and/or performing the sequence of camera functions outlined above.

For the purposes of this disclosure, the term sequence of sequencing means the orderly occurrence of the above functions. It does not means some of the functions cannot occur at the same time or overlap. For example, it is a common practice to have at least some of the film exposure reset functions going on during the film advance, processing, and film eject portions of the operating cycle.

The prior art is replete with camera mechanism and/or systems for initiating, controlling or performing one or more or all of the above functions. Of special interest are those systems which include a sequencing or timing wheel, gear, or cam that is driven through a single 360° revolution during the course of a camera operating cycle and initiates, controls and/or performs functions in a dependent relationship with respect to the angular disposition of such a rotating member relative to a predetermined starting position.

The term timing wheel found in many prior art disclosures is not a very accurate description, because in many systems, the rotating wheel does not operate on a linear-time base. For example, its rotation may stop one or more times during the course of the camera cycle of operation or the initiation of rotation may not coincide with the beginning of the cycle. Therefore, it will be understood that when the term sequencing wheel or gear is used in this disclosure, it may be interchanged with the term timing wheel or gear in other prior art disclosures.

The following are representative examples of cameras, disclosed in the prior art, that feature a single revolution sequencing member for initiating, controlling or performing one or more of the above-described functions.

U.S. Pat. No. 3,683,771 issued to E. H. Land on Aug. 15, 1972 discloses a camera having a single revolution cam for advancing a film unit from the exposure position to the processing station. U.S. Pat. No. 3,714,879, issued to E. H. Land, et al. on Feb. 6, 1973 describes a highly automated camera which has a single revolution timing gear for positioning a reflex member and coordinating a plurality of electrical switching functions. U.S. Pat. No. 3,744,388, issued to I. Erlichman on July 10, 1973 shows a reflex camera which includes a single revolution member for positioning a reflex mirror and advancing a film unit. U.S. Pat. No. 3,757,657, issued to V. K. Eloranta, et al. discloses a single revolution crank which performs the functions of advancing a film unit from the exposure position to a pair of rollers, driving the processing rollers, and recocking the shutter. U.S. Pat. No. 3,826,655, issued to R. J. Borel et al. on July 30, 1974 described a self-developing camera which includes a single revolution timing gear for operating an electrical switch and a film advance mechanism.

The highly automated self-developing cameras that are presently on the market are relatively expensive because of complicated mechanism needed to perform so many interrelated functions during a very short (1.5 second) camera cycle. Also, the manufacturing costs are inflated because these cameras are very compact and require miniaturized components which must be made and assembled to extremely tight manufacturing tolerances that generally are not found in cameras that are aimed toward the mass-amateur-camera market.

SUMMARY OF THE INVENTION

The present invention provides a photographic apparatus, preferably in the form of a camera, for exposing and processing self-developing film units. The apparatus features a low-cost, efficient, and easy-to-manufacture "sequencing system" for initiating and controlling the orderly performance of a majority of the camera functions comprising a complete photographic cycle of operation.

In a preferred embodiment, the sequencing system is incorporated into a simple and low-cost version of an automated self-developing camera. More specifically, the system is configured for use in a nonreflex viewing camera wherein the taking lens shutter is normally in a closed, light-blocking configuration (except for the exposure interval).

The sequencing system is built around a sequencing gear which makes a single, 360° revolution during the course of a cycle of camera operation. In operation, the sequencing gear, driven through a gear train by an electrical motor, preferably initiates, controls, and/or performs the functions of: unlatching a shutter; closing an electrical switch to "latch on" power to the camera's electronic control circuit; moving a film advancing mechanism or pick to advance an exposed film unit from the film container to a camera-mounted processing station; relatching the shutter subsequent to exposure; indexing a film counting device; and reopening the electrical power switch to terminate the cycle.

The camera shutter mechanism is preferably spring-based towards its open position and is returned to its closed position, against the biasing force, by electromagnetic means, such as a solenoid. A shutter latching member, for latching and unlatching the shutter is preferably mounted for movement with the film advancing device along with a power switch actuating member. The film advancing device is preferably coupled to the sequencing gear by means of a profile cam on the gear and a cam follower on the film advance device, such that the position of the film advancing device is responsive to the angular disposition of the sequencing gear. The sequencing gear also includes a pin thereon which indexes the camera mounted film counting device.

The sequencing system of the instant invention is characterized, and is distinguishable over the prior art systems, by the unique combinations of functions performed, the sequence in which these functions are performed, the economy of the sequencing system in terms of the relatively few component parts thereof and the small amount of space occupied within the camera housing, and the ease of manufacture that is afforded by the simplicity of the system.

More specifically, the sequencing system includes a shutter latching and unlatching member that is positionable in a dependent relationship to the angular disposition of the sequencing gear. The film advance mechanism, shutter latching device and switch operating device are embodied in a unitary structure that is movable in a dependent relationship to the angular disposition of the sequencing gear. The system initiates, controlling and/or performs the four functions of shutter latching, counter indexing, film advance, and electrical switch operation during the course of a single revolution of the sequencing gear. None of these enumerated features are disclosed or suggested by the previously cited prior art patents.

Therefore, it is a primary object of the present invention to provide a photographic apparatus which includes an efficient, low cost, and easy to manufacture sequencing system for initiating, controlling and/or performing functions in an operating cycle of operation of said apparatus which includes exposing and processing a self-developing film unit.

It is another object of the invention to provide a sequencing system which includes a sequencing gear or wheel that is adapted to be rotated through a single 360° revolution during the course of a cycle of operation and means responsive to the angular disposition of the sequencing gear for performing functions which may include the latching and unlatching of a shutter, operating an electrical switch, indexing a film counting device, and advancing a film unit from an exposure position to a film unit processing station.

Another object of the invention is to provide a camera for exposing and processing a self-developing film which includes a film advancing mechanism movable between first, second, and third positions for advancing a film unit from an exposure position to a film unit processing station and for performing other camera functions, such as latching and unlatching a shutter and/or opening and closing an electrical switch.

It is yet another object of the invention to provide a camera for exposing and processing a self-developing film unit which includes a sequencing system comprising sequencing means mounted for rotation through a single 360° revolution during the course of a cycle of camera operation and means responsive rotation said sequencing means through different angular segments of said single revolution for initiating, controlling and/or performing a variety of functions included in a cycle of operation of the camera.

Other objects of the invention will, in part, be obvious and will, in part, appear hereinafter.

BRIEF DESCRIPTION OF THE DRAWINGS

For a fuller understanding of the nature and objects of the invention, reference should be had to the following detailed description taken in connection with the accompanying drawings wherein.

DESCRIPTION OF THE PREFERRED EMBODIMENT

Figure 1:
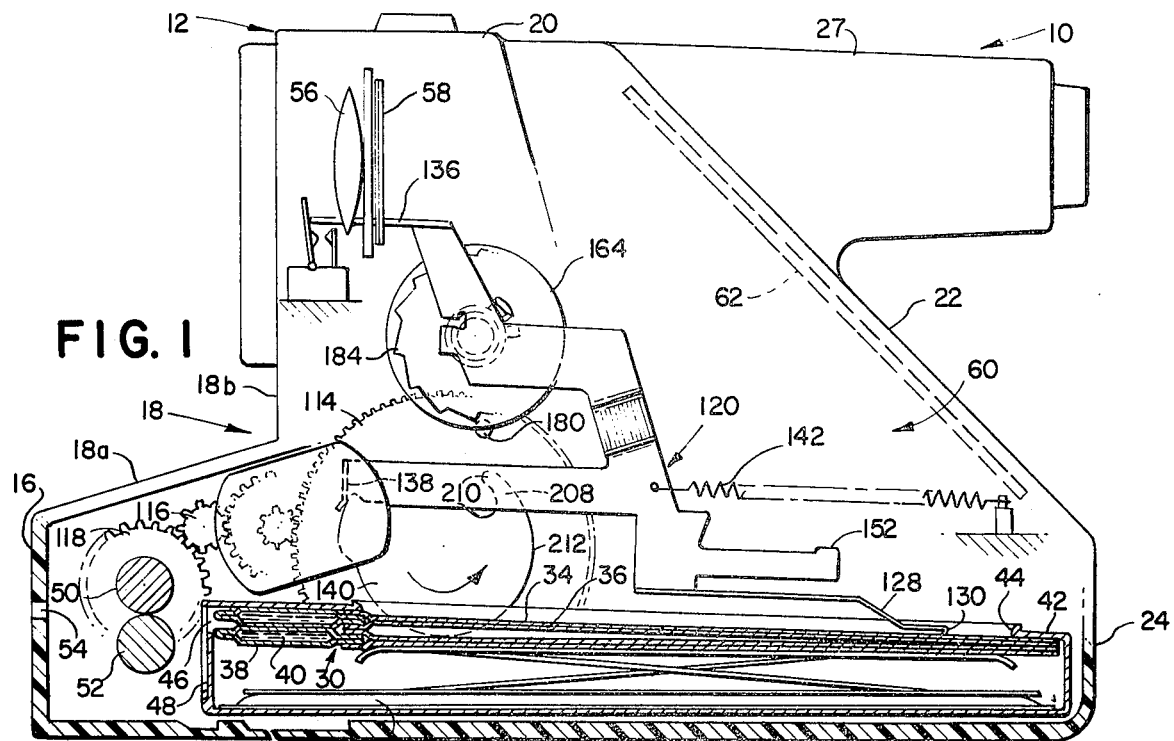
FIG. 1 is a side elevational view, partly in section, of a camera for exposing and processing self-developing film units showing the structural relation of the component parts of the camera.
Figure 3:
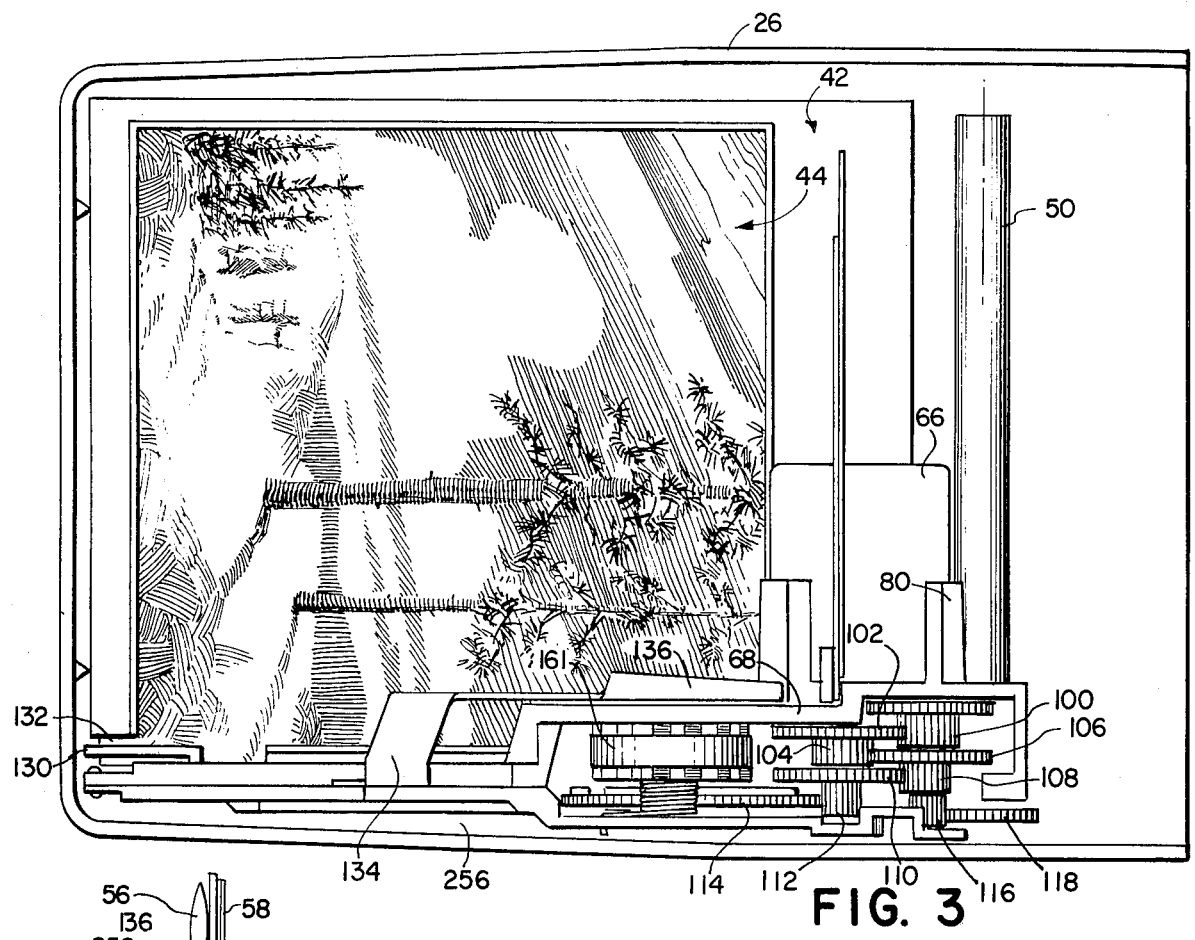
FIG. 3 is a top elevational view of a camera shown in FIG. 1, taken along lines 3—3 showing the details of the assembly of FIG. 2 in its proper relation to other components of the camera.
Figure 4:
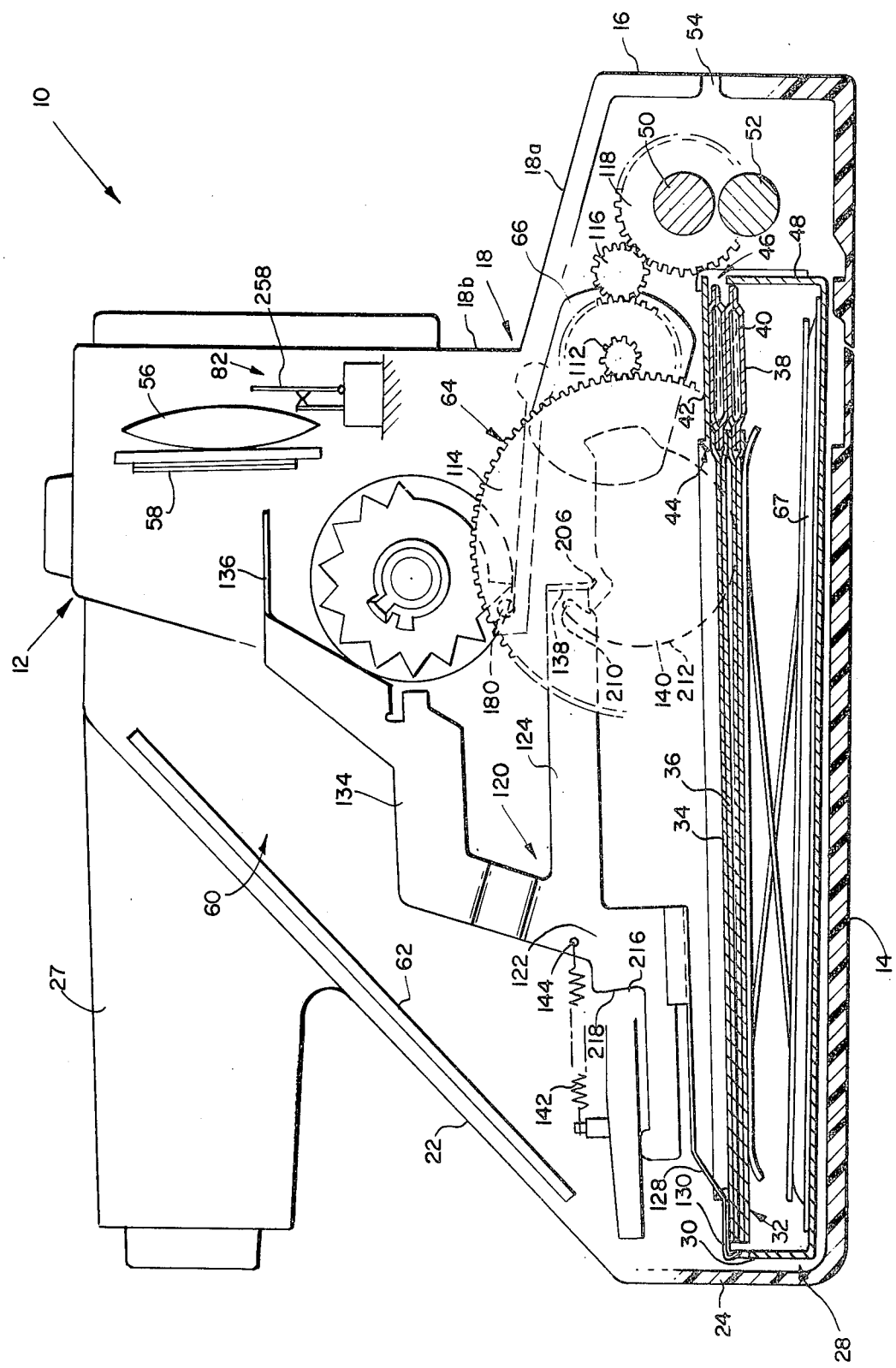
FIG. 4 is an opposite side elevational view, partly in sections, of the camera shown in FIG. 1.

FIGS. 1, 3, and 4 of the drawings show a camera 10 for exposing and processing self-developing film units. Camera 10 includes a housing 12 defined by a planar bottom wall 14, a leading end wall 16, a forward wall 18 having an incline lower section 18a and a vertical upper section 18b, a top wall 20, and inclined rear wall 22, a trailing end wall 24, and a pair of enclosing side walls 26 (See FIG. 3). The housing 12 is preferably of molded plastic construction and may include an integrally molded viewfinder housing 27 extending rearwardly from forward wall section 18B.

The lower portion of housing 12 includes a chamber 28 therein for receiving and supporting a film container 30 holding a plurality of self-developing film units 32 arranged in stacked relation therein.

For the ease of illustration, the film units 32 are shown to include two sheet-like elements 34 and 36 which are arranged in superposed relation, and a rupturable container 38 holding a supply of fluid processing composition 40, attached to one end of sheet-like elements 34 and 36. In reality, the film units 32 are multilayer structures which include one or more photosensitive and image-receiving layers sandwiched between a top transparent outer sheet (part of element 34) and an opaque bottom outer support sheet (part of element 36). A film unit 32 is exposed by transmitting light through the transparent outer sheet or "exposure window." Subsequent to exposure, the rupturable container 38 is subjected to a compressable pressure thereby discharging the processing fluid 40 between a predetermined pair of adjacent layers to initiate a development and diffusion transfer process. When the resultant positive image is formed, it is viewed through the same transparent top outer sheet which served as the exposure window.

The film unit 32 may be exposed and processed without having to superpose and/or separate individual sheetlike elements and it is referred to as an "integral type" self-developing film unit. It will be understood that the illustrated sheet-like elements 34 and 36 have been used to diagrammatically show a boundary separating the predetermined layers between which the processing fluid 40 is distributed.

Since film unit 32 forms no part of the instant invention, it will not be described in further detail in this disclosure. Film unit 32 is intended to represent a general class of "integral type" self-developing film units of which there are many species. For detailed descriptions of some of the various species, reference may be had to U.S. Pat. No. 3,415,644 issued to E. H. Land on Dec. 10, 1968 and U.S. Pat. No. 3,594,165 issued to H. G. Rogers on July 20, 1971.

The film container 30 includes a forward wall 42 having an exposure aperture 44 therein which is coextensive with the exposure window of the film unit 32. After the forwardmost film unit in container 30 has been exposed by light transmitted through aperture 44, it is advanced forwardly (to the left and right respectively as shown in FIGS. 1 and 4) through a film unit withdrawal slot 46 in a leading end wall 48 of container 30 and into the bite of a pair of juxtaposed cylindrical pressure applying rollers 50 and 52. As the film unit 32 is further advanced between rollers 50 and 52, they apply a compressive pressure which ruptures fluid container 38 thereby discharging the processing fluid 40 between the predetermined layers of film unit. A film unit 32 exits camera housing 12 through a withdrawal slot 54 in leading end wall 16 and processing fluid 40 includes an opacification system which prevents further exposure of the photosensitive layers of the film unit 32 thereby permitting the development and diffusion transfer process to take place outside of the camera housing 12.

Portions of the leading end of housing 12 may be pivotally connected in such a manner so as to allow the leading end wall 16, the leading ends of side walls 26, the leading end portion of bottom wall 14 and the rollers 50 and 52 to be pivoted downwardly thereby providing access to chamber 28 for loading and unloading a film container 30.

The film exposure means of camera 10 includes objective lens 56 mounted in camera housing forward wall section 18b and a shutter mechanism 58 (to be described in detail hereinafter) mounted behind lens 56 for regulating the transmission of image-bearing light into an exposure chamber 60 within housing 12.

Light rays passing through lens 56 travel across chamber 60 and impinge upon a reflex mirror 62 mounted at an appropriate angle on the interior surface of housing rear wall 22 for directing the light rays downwardly and through the exposure window 44 of the film container 30 to expose the forwardmost film unit at the exposure position shown in FIGS. 1, 3, and 4. Reflex mirror 62 serves a dual purpose. First it allows the optical path from lens 56 to the forwardmost film unit to be folded and thereby reducing the overall dimensions of the camera. Secondly, it provides an image reversal which is necessary when film units of the type described in the aforementioned U.S. Pat. No. 3,415,644 and utilized. It will be understood that when integral self-developing film units of the type which do not require an image reversal are utilized, camera 10 may be constructed with a straight line optical path between the lens and film unit or, in the alternative, a folded optical path may be constructed using two mirrors thereby causing no net image reversal at the camera's exposure plane.

The foregoing has been a brief general description of camera 10, film container 30, and film unit 32 to provide background information for the following detailed disclosure of a camera sequencing system. It will be understood that other camera elements such as viewfinder optics, automatic exposure control devices, interior baffles, etc. will be included in a typical camera 10 but will not be disclosed or discussed in this disclosure since they are not necessary to the understanding of the instant invention.

Camera 10 is provided with a motor-driven gear train and camera sequencing assembly shown generally at 64 in FIGS. 1, 2, 3, and 4. This assembly 64 drives the processing rollers 50 and 52; and actuates, controls and/or performs the functions of unlatching shutter 58, closing an electrical switch for latching on electrical power to an electrical circuit, advancing the exposed film unit 32 from the exposure position within the film container 30 to the bite of the processing rollers 50 and 52, indexing a film counter, and relatching the shutter 58 and reopening the electrical switch to terminate a cycle of camera operation.

Figure 2:
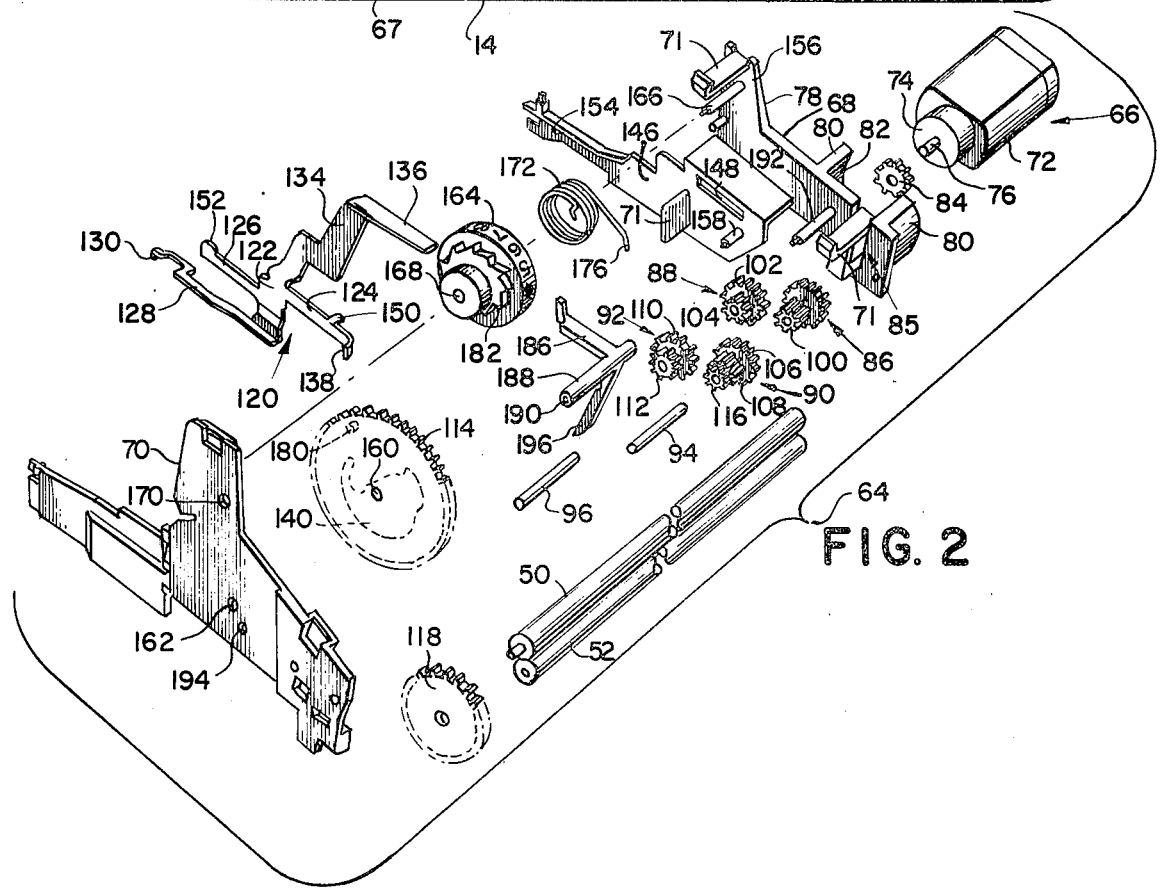
FIG. 2 is a perspective view, shown in exploded fashion, of a motor driven gear train, film advancing device, and sequencing system embodying the instant invention.

FIG. 2 shows the gear train and sequencing system 64 in exploded fashion. Drive power for the system is provided by an electrical motor 66 which may be powered from an elecrical battery 67 in the bottom of film container 30, through contacts and lead wires not shown, or, in the alternative, motor 66 may be powered from a separate battery pack which may be mounted within camera housing 12.

Motor 66 is preferably a high-speed DC motor which is intended to operate at a nominal speed of 12,000 rpm when connected to a DC voltage supply of approximately 6 volts.

Assembly 64 includes a pair of spaced side mounting plates 68 and 70, respectively, for mounting the component parts of the gear train, film advancing mechanism, sequencing gear, and film counter in operative relationship to one another. Mounting plates 68 and 70 are preferably formed of molded plastic to minimize the production cost of assembly 64.

In a preferred embodiment, the assembly 64 is intended to be manufactured as a self-contained modular unit which may be assembled and tested before being installed in camera 10. The modular concept is enhanced by the molded construction of mounting plates 68 and 70. As will be described later, the interior mounting plate includes integrally molded or attachable structure for mounting all of the movable component parts. After these parts are assembled in operative relation to one another, the exterior plate 70 is attached to plate 68 by means of snap-together tabs 71 thereby locking the assembled components in place.

The motor 66 is mounted on the right side (as viewed in FIG. 2) of the interior mounting plate 68. It will be noted that motor 66 includes a generally parallelepiped shaped main housing having slightly curved sidewalls 72. Extending forwardly from one end of the motor housing is a cylindrical bearing 74 for rotatably supporting the motor drive shaft 76. A major and substantially planar wall section 78 of mounting plate 68 includes a pair of integrally molded and outwardly expending motor mounting arms 80 having interior concave surfaces 82 which compliment the convex radius of the motor sidewalls 72. Although not visible in the drawing, the major sidewall section 78 includes an integrally molded open-bore bushing therein for receiving the cylindrical bearing 74 of the motor. The bushing is dimensioned such that bearing 74 may be frictionally pressed thereinto, thereby preventing lateral and longitudinal movement of the motor 66 with respect to mounting plate 68. The mounting arms 80 frictionally engage the sidewalls 72 of the motor 66 to prevent rotation of the motor housing relative to mounting plate 68. With motor 66 mounted on mounting plate 68, the motor shaft 76 extends through the bushing and is accessible on the interior side of the plate 68. A gear 84 is press fitted onto shaft 76 and serves as the first gear in the gear train. Access to the gear teeth on the circumference of gear 84 is provided by an integrally molded opening 85 is mounting plate 68.

Gear 84 is adapted to drive a cluster of four compound speed reduction gears 86, 88, 90 and 92. Gears 86 and 90 are mounted for free coaxial rotation on a shaft or pin 94 extending between the mounting plant 68 and 70. A similar shaft or pin 96 is provided behind shaft 94 for rotatably supporting gears 88 and 92. In a preferred embodiment, pins 94 and 96 are formed of a metal such as stainless steel and are press fit into appropriate opening in plates 68 and 70.

Gear 84 meshes with a large diameter section 98 of gear 86 (see FIG. 3). An integrally formed and coaxially disposed smaller diameter section 100 of gear 86 meshes with a large diameter section 102 of compound gear 88. An integrally formed and coaxially disposed smaller diameter section 104 of gear 88 meshes with a large diameter section 106 of compound gear 90 which in turn has a small diameter section 108 that meshes with a large diameter section of 110 of compound gear 92. A small diameter section 112 of gear 92 meshes with a sequencing gear or wheel 114 which will be described in detail later.

In the drawings, some of the illustrated gears do not show a complete set of teeth about the periphery of the gear. In reality, all of the gears do have a complete set of teeth unless otherwise noted.

Compound gear 90 also includes a small diameter gear section 116 extending outwardly in coaxially relation with small gear section 108. It will be noted that while small diameter section 116 has approximately the same diameter as section 108, it has fewer gear teeth around the circumference. Gear section 116 is adapted to mesh with and drive a roller gear 118 fixedly coupled to a top roller 50 in coaxial relationship therewith. Although not shown in the drawing, gear section 116 is keyed to gear section 108, by a spline and slot arrangement, for rotation therewith.

In a preferred embodiment, all of the gears and gear sections described, with the exception of gear section 116 and the roller gear 118, may be formed of synthetic material such as nylon or any other material which may be molded and is suitable for applications where the gears are subjected to relatively light loads. On the other hand, gear section 116 and roller gear 118 are relatively heavily loaded because their function includes driving the exposed film unit 32 between the rollers 50 and 52 along with causing the fluid bearing pod 38 to rupture and distributing the processing fluid 40 between the predetermined layers of the film unit. Therefore, gear section 116 and gear 118 are preferably formed of any suitable material appropriate for such loads, for example brass or stainless steel.

Assembly 64 also includes a reciprocating film advance member or device 120 for advancing the forwardmost film unit 32 in the film container 30 from the exposure position, through the film withdrawal slot 46, and into the bite of processing rollers 50 and 52. The main portion of film advance member 120 is preferably stamped from a thin sheet of metal such as stainless steel and includes a center support section 122 having a first arm 124 extending forwardly therefrom and a second arm 126 extending rearwardly. A third arm 128 attached to and extending rearwardly from support section 122 includes a hooked end 130 for engaging a trailing end of the forwardmost film unit 32. As the film advancing member 120 is advanced forwardly, by means to be described hereinafter, the trailing hook end 130 pulls on the trailing end of the film unit 32 to advance it through the withdrawal slot 46 and into the bite of rollers 50 and 52. Access for the film engaging hook 130 is provided by an elongated slot 132 at a trailing end corner of the film container 30 (see FIG. 3).

Extending upwardly and outwardly (towards mounting plate 68) and finally forwardly of center support section 122 is fourth arm 134 of the film advancing device 120. Extending upwardly from arm 134 is a forwardly projecting finger 136 which will be utilized to perform camera functions other than film advance, such as latching the camera shutter 58 and opening and closing an electrical switch.

The first arm 124 includes a right-angle inward bend at its free forward end thereby defining an end surface 138 which is adapted to follow a profile cam 140 formed on the interior surface of sequencing gear 114. As will be described in detail hereinafter, the combination of cam 140 and a biasing spring 142 attached to support section 122 at 144 will be utilized to determine the longitudinal disposition of the film advancing member 120 with respect to the fixed mounting plate 68 and 70 in response to the angular disposition of sequencing gear 114 relative to a predetermined starting position.

The center support section 122, the first arm 124, and the second arm 126, of film advance device 120 are configured in coplanar relation. These three elements of film advanced device 120 are adapted to slide along a planar surface 146 on the interior side of mounting plate 68. Surface 146 has a longitudinal elongated slot 148 therein for receiving an outwardly extending guide tab 150 on arm 124. The rearwardly extending arm 126 has an upwardly extending rounded surface 152 at its trailing end which follows and is guided by a longitudinal camming surface 154 extending inwardly from surface 146. When positioned on surface 146 for forward and aft sliding movement, the upper offset arm 134 and its integrally formed finger 136 are positioned on the outside of an upwardly extending section 156 of mounting plate section 78.

Mounting plate 68 includes an inwardly extending and integrally molded shaft 158 for rotatably mounting the sequencing gear 114 thereon. Shaft 158 extends through a central bore 160 of gear 114 and its end is pressfit into appropriate receiving hole 162 on mounting plate section 78. When so positioned, the cam follower surface 138 on film advance arm 124 engages the periphery of profile cam 140. In combination with biasing spring 142, cam 140 determines the longitudinal disposition of the film advancing device 120 with respect to the mounting plate 68 and 70.

In addition to the gear train and film advancing device 120, assembly 64 also includes a film counting wheel 164 having indicia thereon for visually indicating through a window in camera housing rear wall 22 (not shown), to the user how many film units 32 are left in the film pack 30. In a preferred embodiment, film container 30 includes 10 film units 32 and a covering darkslide for preventing exposure of the forwardmost film unit prior to insertion of the film container 30 in camera 10. As will be described hereinafter, the camera 10 is adapted to eject the darkslide in the same manner as a film unit 32. After a darkslide ejection, the wheel indicates the numeral 10 through the window and descends one digit per camera cycle of operation to the numeral 1.

Wheel 164 is mounted on an integrally formed shaft 166 extending inwardly from wall section 156 of mounting plate 68. Shaft 166 extends through a central bore 168 of wheel 164 and the end thereof is pressfit into a suitable opening 170 on mounting plate 70. A helical biasing spring 172 is seated in the hub section of wheel 164 having a free end 176 thereof connected to mounting plate 68. Counterwheel 164 is adapted to be indexed one numeral position (approximately 25°) in response to each cycle of camera operation. Since sequencing gear completes a single 360° revolution during each cycle of camera operation, it is preferable that gear 114 perform the indexing function.

A pin 180 on the interior surface of sequencing gear 114 (see FIG. 1) is positioned to engage a ratchet wheel 182 on counter 164. The teeth of ratchet wheel 182 are designed such that the pin 180 engages a particular tooth, turns the counter wheel 164 through a 25° arc, and is disengaged therefrom at the end of the 25° arc indexing segment. A ratchet wheel 184 on the opposite side of counter wheel 164 is engaged by a pawl arm 186 which captures wheel 164 after each 25° rotation. It will be noted that spring 172 is being wound as the counter turns. The function of pawl 186 is to prevent reverse rotation of the counter 164 by spring 172 after the pin 180 on gear 114 is disengaged with the ratchet wheel 182. After the counter has been fully wound, the arm 186 is adapted to be disengaged from the ratchet wheel 184 to allow the counterwheel 164 to return to its starting position under the influence of bias spring 172.

The pawl arm 186 is preferably integrally molded with a transverse cylindrical support section 188 having an open bore 190 therein. An integrally molded shaft 192, extending inwardly from mounting plate 68, extends through bore 190 and it is pressfit into a suitable receiving hole 194 of mounting plate 70. Extending downwardly from support section 188 is a depending arm 196 which is engageable by the forward wall 42 of a film container 30 located in the operative position within camera 10. The engagement of film container 30 with arm 196 causes the pawl arm 188 to be biased upwardly (as viewed in FIG. 2) such that its end is in engagement with ratchet wheel 184. When the film container 30 is removed, the center support section 188 rotates in a counterclockwise direction (as viewed in FIG. 2) allowing the pawl arm 186 to drop out of engagement with ratchet wheel 184. In this manner, the counterwheel 164 is returned to its starting position under the influence of spring 172.

In operation, the motor 66 drives the first gear 84 in the train in a counterclockwise direction as viewed in FIG. 2. Gears 86 and 90 are thereby driven in a clockwise direction with gears 88 and 92 being driven in a counterclockwise direction.

Power for driving the top roller 52 is taken off the gear train at small diameter gear segment 116. This constitutes a first power loop of the system. Gear 116 is in turn connected to roller gear 118 thereby driving the upper roller 52 in a counterclockwise direction (as viewed in FIG. 2).

A second power loop of the gear train turns the sequencing gear 114. The power input for the second loop is taken off gear segment 108 and is transferred through gear 92 thereby turning the sequencing gear 114 in a clockwise direction as viewed in FIGS. 2 and 4.

In a preferred embodiment of the invention, the gears in the first power loop are selected such that a speed reduction of 20:1 is achieved from motor 66 to the top roller 50. The speed reduction from motor 66 to the sequencing gear 114 is preferably 150:1.

The film advance profile cam 140, on the interior surface of sequencing gear 114, is best shown in FIGS. 1 and 4 of the drawings. Cam 140 is shown in its starting or 0° position in FIGS. 1 and 7a from which it will rotate through a single 360° revolution in a counterclockwise direction (as viewed in FIG. 1) during the course of a complete cycle of camera operation.

The film advance cam follower surface 138 on the leading end of arm 124 engages and follows the periphery of portions of cam 140. Cam follower surface 138 is held in engagement with cam 140 by the rearward force applied to film advance device 120 by the biasing spring 142. As best shown in FIG. 4 of the drawings, the trailing end of spring 142 is connected to an integrally molded upstanding post 198 near the trailing end of mounting plate 68.

Figure 7A:
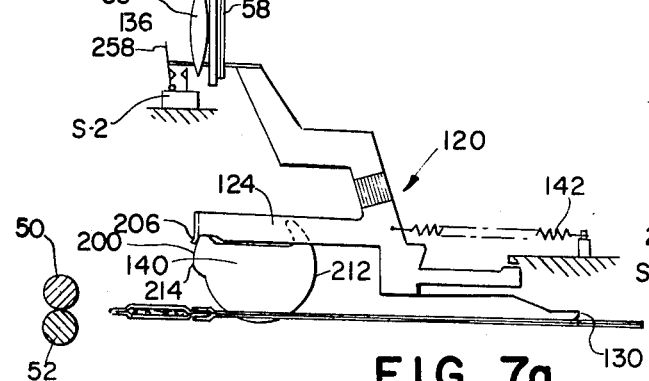
FIGS. 7a, 7b, and 7c are diagrammatic illustrations of the first, second, and third operative positions of the sequencing system.

FIGS. 1 and 7a of the drawings shows the cam 140 on sequencing gear 114 in its 0° position with cam follower surface 138 on arm 124 engaged with a constant radius portion on dwell lobe 200 of profile cam 140. The film advance device 120 is held by lobe 200 in a first or forwardmost position thereof relative to mounting plates 68 and 70. Because lobe 200 has a constant radius relative to the central bore 160 of sequencing gear 114, the film advancing device 120 will remain in this forwardmost position until the uppermost corner 204 of lobe 200 becomes disengaged from the lowermost corner 206 of cam follower surface 138 in response to rotating sequencing gear 114, and therefore cam 140, in a counterclockwise direction as viewed in FIG. 1.

Following the contours of profile cam 140 in a clockwise direction (as viewed in FIGS. 1, 7a, 7b, and 7c) from corner 204, the cam is cut away from a linear rearward path of travel of the lower edge 206 of cam follower surface 138 until it returns toward this path of travel to define a curved finger portion 208. Starting at the end 210 of finger 208 the outside radius thereof defines a constant radius or dwell lobe 212. The radius of lobe 212 is smaller than the radius of lobe 200 with respect to the center bore 160. The end of lobe 212 is joined to the beginning of lobe 200 by an inclined transition surface 214.

In operation, the sequencing gear 114 is rotated from the starting position in a counterclockwise direction (as viewed in FIGS. 1, 7a, 7b, and 7c) and in a clockwise direction (as viewed in FIGS. 2 and 4) for approximately 30° at which point the end 204 of lobe 200 drops below the rearward path of travel of the lower edge 206 of cam follower surface 138. Because there is no intervening cam structure in the path of travel intermediate corner 204 of lobe 200 and the end 210 of finger portion 208, the film advancing device 120 travels rearwardly (to the left as viewed in FIG. 4) under the influence of biasing spring 142 to locate the film advancing device 120 in its rearwardmost position relative to mounting plates 68 and 70. It will be noted that the rearward movement of film advance device 120 is terminated by the abutting engagement of a trailing edge 216 of center support section 122 with a forward edge 218 on mounting plate cam surface 154. This surface 218 is positioned in the path of travel of edge 216 and serves to accurately locate the rearwardmost or second position of the film advance device 120.

It will be noted that cam follower surface 138 on arm 124 does not engage the end 210 of finger 208 on profile cam 140 to stop the rearward movement of film advance device 120. As will be explained later, it is important to accurately determine the rearwardmost position of film advancing device 120 because it is in this position that the hooked end 130 is located in position to engage the trailing edge of the forwardmost film unit in film container 30. Therefore, it is desirable that the rearwardmost position be fixed by the static surface 218 on mounting plate 68 rather than the rotating end 210 of finger portion 208.

When film advancing device 120 has reached the rearwardmost position (see FIGS. 4 and 7b of the drawings), the end 210 of finger portion 208 is positioned behind (to the left as viewed in FIG. 4) cam follower surface 138.

Approximately 20 more degrees of rotation is required before the end 210 of finger 208 is engaged with the mid-portion of cam follower surface 138. The finger end 210 remains in contact with cam follower surface 138 during the next approximately 85° of rotation thus driving the film advance device 120 forwardly (to the right as viewed in FIG. 4) to the third or intermediate position of the film advance device 120 as shown in FIG. 7c thereby advancing the film unit 32 into the bite of rollers 50 and 52. This intermediate position is approximately 0.100 of an inch to the rear of the forwardmost position of device 120.

At the intermediate position, the end 210 of finger portion 208 passes below the path of travel of the lower edge 206 of cam follower surface 138 and the cam follower surface 138 rides along the constant radius dwell lobe 212 of cam 140. The length of lobe 212 is such that film advance device 120 is maintained at the intermediate position for approximately the next 200° of counterclockwise rotation of cam 140 which the film unit 32 is advanced through rollers 50 and 52.

During the last approximately 15° of cam rotation, the cam follower surface 138 is engaged by the inclined transition surface 214 which moves the film advance device 120 forwardly from the intermediate position to the forwardmost position thereby returning the cam follower surface 138 to its initial position in engagement with lobe 200 of cam 140.

As noted earlier, one of the auxiliary functions performed by the film advanced device 120 is to latch and unlatch shutter 58. In a preferred embodiment of the invention, shutter 58 is of the reciprocating blade type diagrammatically illustrated in FIG. 5 of the drawings. This is a front view of the shutter 58 looking at it from a position just behind objective lens 56.

Figure 5:
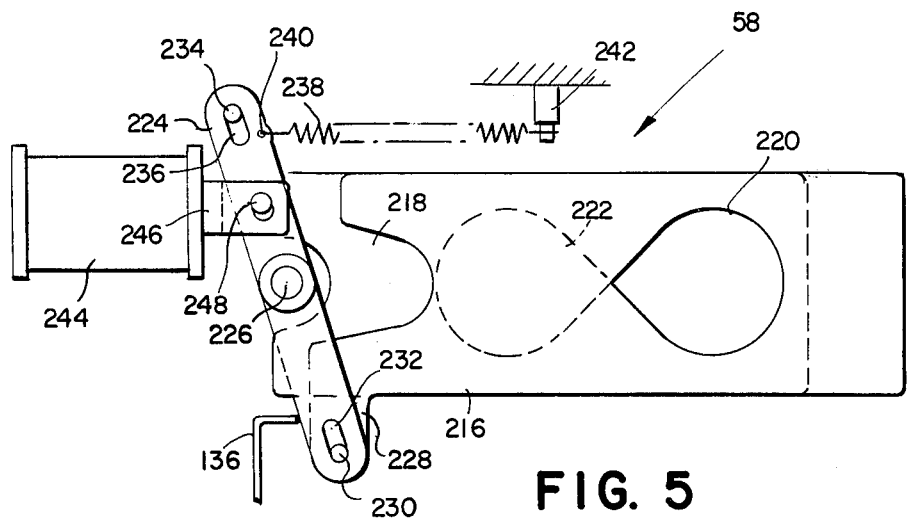
FIG. 5 is a diagrammatic illustration of a reciprocating blade shutter that is adapted to be latched by a portion of the film advancing device.

Shutter 58 comprises a pair of thin elongated shutter blades 216 and 218 mounted in a guide track (not shown) in superposed relation for linear reciprocating movement relative to each other in opposite directions. The forward blade 216 has a generally pear-shaped opening 220 therein that is adapted to be brought into and out of registration with a mirror image teardrop shaped opening 222 in the rear blade 218. FIG. 5 shows the shutter 58 in its light blocking configuration wherein there is no overlapping relationship of openings 220 and 222.

In operation, the forward blade 216 moves to the left and the rear blade 218 moves to the right (as viewed in FIG. 5) establishing an overlap of the openings 220 and 222 which defines an aperture through which light rays transmitted from lens 56 may pass to impinge upon mirror 62. It will be noted that the size of the aperture created by the openings 220 and 222 increases as a function of the relative movement of blades 216 and 218 because of the teardrop shape of openings 220 and 222.

Blades 216 and 218 are adapted to move, relative to one another, at a uniform rate. The movement from the light-blocking configuration of FIG. 5 towards the unblocking position is relatively slow so that the size of the taking aperture increases at a fairly slow rate. Movement of the blade in the opposite direction is fairly rapid to sharply and efficiently terminate the exposure cycle. In high level ambient light conditions, the opening movement is of short duration and therefore the exposure is executed at a fairly small average taking aperture. Under low level ambient lighting conditions, the opening movement of the blades takes place over a longer period of time and thus the exposure is made under a correspondingly larger average aperture opening.

In a preferred embodiment of the camera 10, an automatic exposure control circuit which includes a photocell senses the ambient lighting conditions and controls the duration of blade movement toward the unblocking position by means of integrating circuits that are well known in the photographic art.

The blades 216 and 218 are moved by a walking beam or link 224 which is pivoted for rotational movement about pin 226. The lower portion 228 of forward blade 216 is pivotally coupled to walking beam 224 by means of a pin 230 which rides in elongated slot 232 near the lower end of beam 224. The rear blade 218 is similarly coupled to beam 224 by a pin 234 which rides in the elongated slot 236 near the upper end of beam 224.

As beam 224 is pivoted about pivot point 226 in a clockwise direction (as viewed in FIG. 5), the forward blade 216 moves towards the left and the rear blade 218 moves towards the right thereby bringing openings 220 and 222 into their overlapping and unblocking configuration. Pivotal movement of beam 224 in the opposite direction returns blades 216 and 218 to the light-blocking position shown in FIG. 5.

Since camera 10 is of the nonreflex viewing type, the shutter blades 216 and 218 are adapted to be in their light-blocking position at the beginning and end of a cycle of camera operation. Beam 224 is spring biased for clockwise rotational movement by a spring 238 having one end 240 attached to the upper end of beam 224 and its opposite end 242 fixedly attached to a shutter mounting plate (not shown) in camera housing 12. Counterclockwise rotation of beam 224 is accomplished by means of an electrically operated solenoid 244 which has its plunger 246 pivotally connected to beam 224 at pivot 248 above beam center pivot 226. Solenoid 224 is shown in its unenergized state.

As beam 224 is rotated in a clockwise direction by spring 238, solenoid plunger 246 is partially withdrawn from the solenoid housing. Upon an appropriate signal from the automatic exposure control circuit, solenoid 244 is energized thereby causing the plunger 246 to be retracted into the solenoid housing which in turn pivots beam 224 in a counterclockwise direction against the bias of spring 238 to move the blades 216 and 218 to their light-blocking position.

In order to maintain blades 216 and 218 in their light-blocking position shown in FIG. 5, without having solenoid 224 in its energy consuming energized state, it is necessary to provide some sort of latching mechanism to hold walking beam 224 in the light-blocking position shown in FIG. 5. In a preferred embodiment of the present invention, the means for latching and unlatching shutter 58 comprise the forwardly extending finger 136 of the film advance device 120. As will be explained later in detail, the forward end of finger 136 is adapted to extend through a plane containing the rotational path of travel of the lower end of beam 224 when the film advance device is in its forwardmost position.

As shown in FIGS. 3 and 5, the forward end of finger 136 provides a rearwardly movable stop, in the path of travel, against which the lower end of beam 24 abuts to prevent clockwise rotation of beam 224 under the influence of biasing spring 238. In response to rotating sequencing gear 114 and cam 140 through the 0° to 30° segment of rotation from the predetermined starting position, the film advance device 120 moves rearwardly under the influence of biasing spring 142. This rearward movement retracts finger 136 from the path of travel of the lower end of beam 224 thereby permitting rotation of the beam about its pivot 226 towards the shutter open position. During the course of the cycle of camera operation, film advance device 120 moves forwardly to its intermediate position wherein the forward end of finger 136 extends through the plane of rotation of beam 224 to relatch shutter 58 thereby allowing the solenoid 244 to be de-energized.

The illustrated shutter 58 is but one example of a two-bladed shutter that may be latched by finger 136. For an example of another type of shutter that may be used in an alternative embodiment of the present invention, reference may be had to copending application Ser. No. 554,925 filed on even date herewith and now issued on July 27, 1976 as U.S. Pat. No. 3,972,058.

Figure 6:
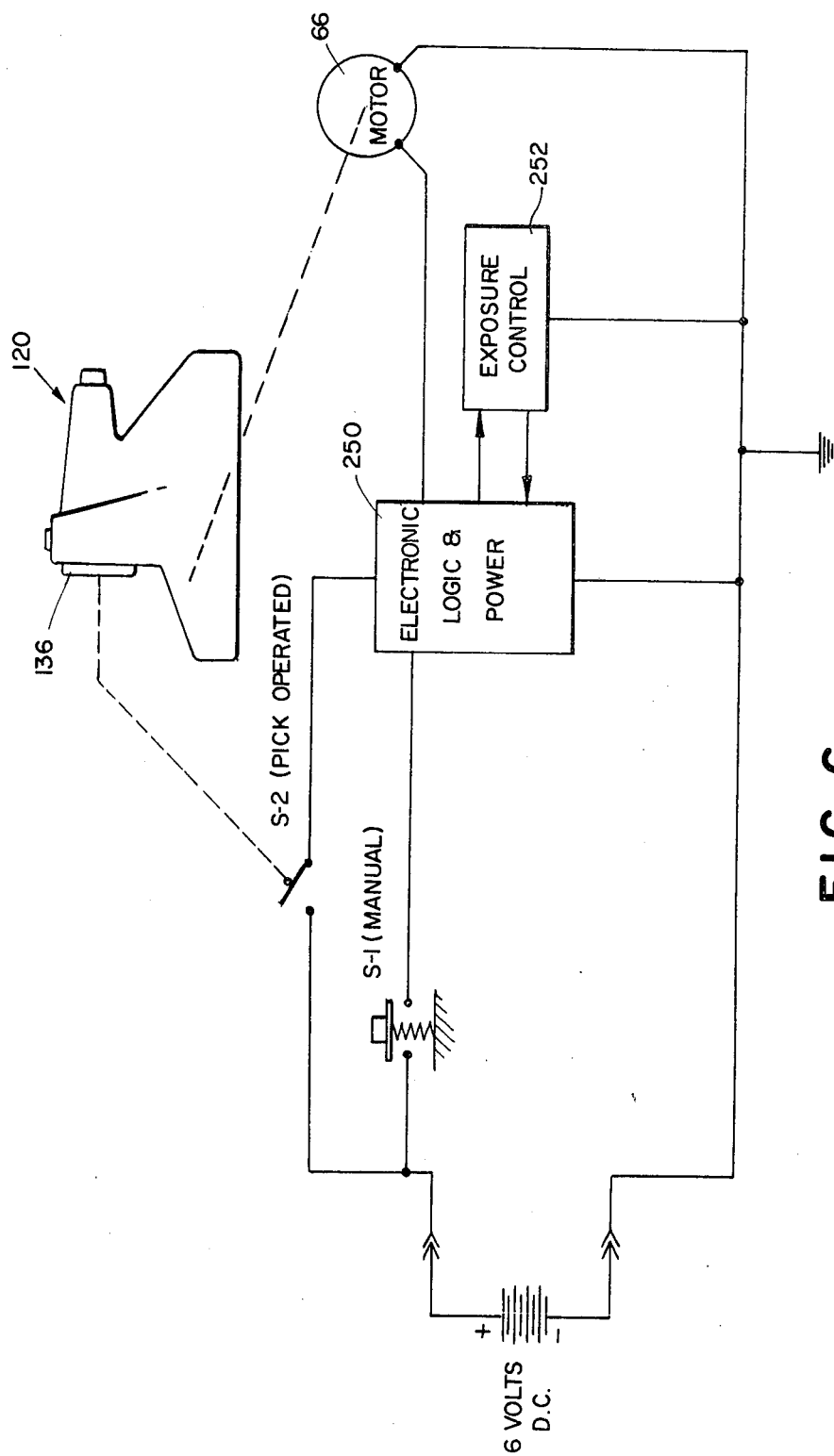
FIG. 6 is a simplified diagrammatic illustration of the camera's electrical circuit.

In addition to latching and unlatching shutter 58 and advancing the film unit 32 from the exposure position into the bite of the rollers 50 and 52, the film advance device 120 is also configured to perform the additional function of operating an electrical switch (S-2) shown in a simplified electronic circuit diagram in FIG. 6 of the drawings. The illustrated circuit is basically a switching, logic, and power system for controlling and integrating the operation of certain subsystems in camera 10.

The heart of the electronic control system is a logic and power circuit or module 250 which may be connected to the 6-volt battery when either or both of parallel switches S-1 and S-2 are closed. Logic and power circuit 250 in turn controls the operation of motor 66 and an exposure control circuit 252 which operates and controls the shutter 58.

In a preferred embodiment of the invention, switch S-2 is spring biased to be normally closed to locate it in an electrically conducting state but is held in the open position, or nonconducting state, by the forwardly extending finger 136 of film advance device 120 when device 120 is located in its first or forwardmost position. As noted earlier, finger 136 also latches the shutter 58 in its light-blocking or closed position when film advance device 120 is in the forwardmost position.

To initiate a cycle of camera operation, the user depresses the normally opened and parallel connected start switch S-1 which connects the battery 62 to the logic and power circuit 250. Circuit 250 provides power to motor 66 which drives the gear train causing sequencing gear 114 to rotate from the predetermined starting position. At the end of the first 30° of rotation of sequencing gear 114, the film advance device 120 moves rapidly from its forwardmost position to its rearwardmost position as described earlier. The rearward movement of the film advance device 120 causes finger 136 to become disengaged from switch S-2 which thereby moves to its closed position. Also, the same rearward movement unlatches shutter 58.

The closing of S-2 serves several functions. First, it latches the power onto logic and power circuit 250 thereby allowing the manual start switch S-1 to be opened by the user taking his finger off S-1 without having a power interruption to circuit 250 for the balance of a cycle of camera operation. Should the user inadvertently release S-1 prior to the sequencing gear 114 completing the first 30° of rotation, the cycle of camera operation will shut down because the power latching switch S-2 will not be moved to its normally closed position by the rearward movement of the film advance device 120. In this instance, the user merely depresses switch S-1 again which will continue the interrupted rotation of sequencing gear 114 until the first angular segment of rotation (30°) is completed.

The second function performed by the closing of switch S-2 is to provide an input pulse to circuit 250 which initiates the operation of exposure control circuit 252 and electronically breaks the rotation and disconnects power from motor 66. The exposure control circuit 252 includes a photocell subcircuit which measures and integrates ambient scene lighting conditions. As the light integration is going on, shutter 58 is opening under the influence of bias and spring 238. When the integrating circuit reaches a predetermined level, exposure control circuit 252 energizes the solenoid 244 to close shutter 58 and terminate the exposure portion of cycle.

The time required for completion of the exposure phase of the camera cycle of operation will, of course, depend upon the scene lighting conditions. At the termination of the exposure phase, control circuit 252 provides a logic input signal to logic and power circuit 250 which thereby initiates and controls the film processing cycle. Circuit 250 once again energizes motor 66 to drive the processing rollers and to continue the single revolution of sequencing gear 114 from the 30° position to its 360° or 0° position.

Rotation of sequencing gear 114 causes the film advance device 120 to be advanced forwardly to the intermediate position thereby feeding the forwardmost film unit 32 into the bite of the rotating rollers 50 and 52 and relatching shutter 58. As the film unit 32 is advanced between the roller to discharge and distribute the film processing fluid 40 between predetermined layers of the film unit 32, the film advance device 120 is maintained at its intermediate position by profile cam 140. At the completion of the film processing mode of operation, cam 140 advances the film advancing device 120 from the intermediate position to its forwardmost position thereby causing the forwardly extending finger 136 to open the normally closed switch S-2. The opening of S-2 disconnects a logic and power circuit 250 from the battery thereby terminating the camera cycle of operation.

It will be noted that just prior to the termination of the cycle, logic and power circuit 250 provides an electronic breaking signal to motor 66 to stop the rotation of sequencing gear 114 at its 360° or 0° position. Circuit 250 also preferably includes a timing subcircuit for terminating the rotation of motor 66 at the end of the camera cycle of operation even if the user fails to manually release S-1 after switch S-2 closes and latches on the power. Therefore the circuit 250 is capable of providing an electronic shutdown of the camera operating cycle should switch S-1 be maintained in the closed position for a time period exceeding that required to cycle the camera through a complete operating cycle.

Figure 8:
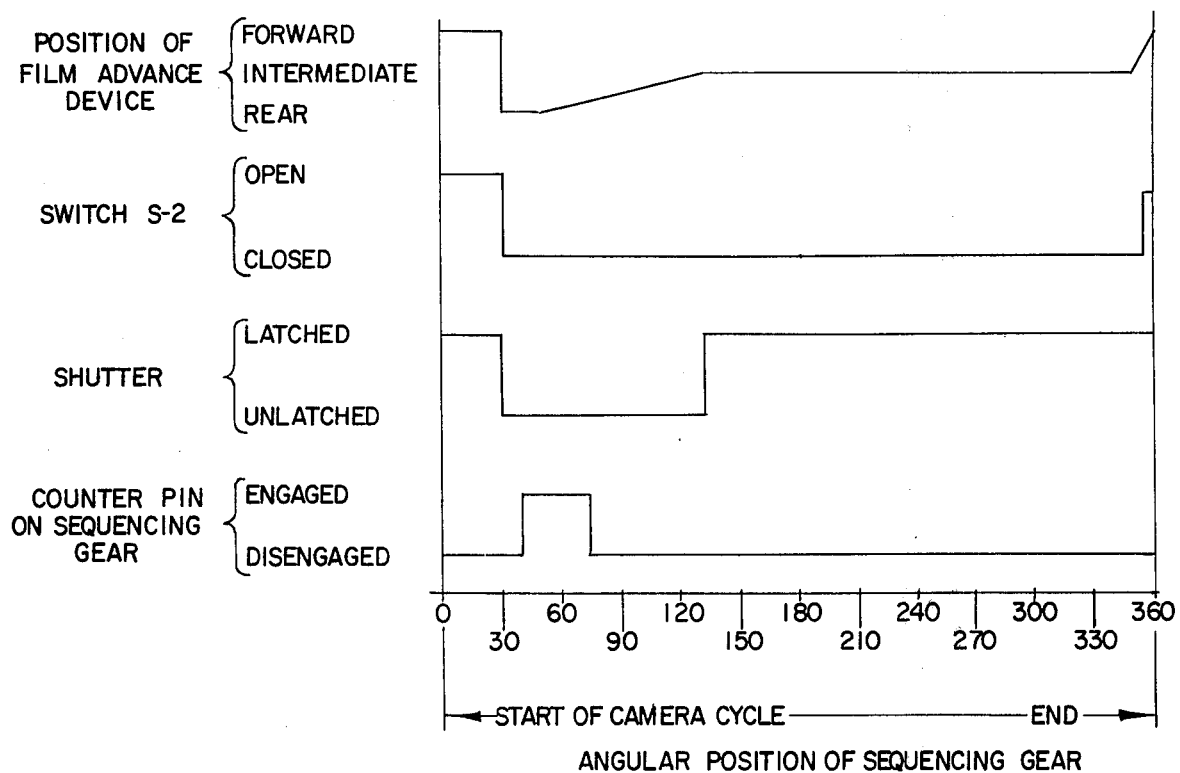
FIG. 8 is a graph showing the status of various camera components versus the angular displacement of the sequencing gear to illustrate the sequence of camera events or functions during the course of a single 360° revolution of the sequencing gear.

The circuit diagram shown in FIG. 8 has been provided to illustrate one embodiment of an electronic control system which utilizes a power latching switch S-2 whose open or closed state is determined by the position of film advance device 120. It will be understood that there are many variations of circuits 250 and 252 which may be utilized performing functions outlined.

As best shown in FIG. 3 of the drawings, the motor gear train, counter and sequencing gear assembly 64 is located and mounted in a longitudinal channel 256 (on the right side of the camera as viewed in FIG. 3) which is defined by the right exterior wall 26 of camera housing 12 and the right sidewall of a film container 30 located at the exposure position.

Assembly 64 is positioned in channel 256 such that the motor 66 extends inwardly therefrom to assume a position overlying the leading end of the forward wall 42 of film container 30 intermediate the leading end wall 48 thereof and the leading edge of the film exposure aperture 44.

As noted earlier in the disclosure, the leading end of camera housing 12 which encloses the processing rollers 50 and 52 and the roller drive gear 118 may be configured to pivot downwardly (as viewed in FIG. 1 of the drawings, to provide access to the film receiving chamber 28. In this type of embodiment, the rollers 50 and 52 are suitably mounted on the leading end section of housing 12 by a mounting bracket (not shown). When the leading end section of housing 12 is pivoted up to its operative closed position, the roller gear 118 is aligned and meshes with the roller drive gear 116.

In the disclosed embodiment, only the top roller 50 is driven to advance the film unit 32 therebetween. It will be understood that it is within the scope of the present invention to provide a coaxially disposed smaller diameter gear section on roller gear 118 which would mesh with another gear fixedly attached to the end of the lower roller 52. By means of this arrangement, both the upper and lower rollers 50 and 52 would be rotatably driven in opposite rotational directions to cause the film unit 32 to be advanced therebetween.

In FIGS. 1 and 7a of the drawings, the sequencing gear 114 is shown in its 0° starting position thereby locating the film advance device 120 in its first or forwardmost position. The forwardly extending finger 136 of device 120 extends through the path of travel of the shutter walking beam 224 thereby latching the shutter 58 in its light-blocking unclosed position. Also, the forward end of finger 136 engages and deflects a spring arm 258 of switch S-2 causing the contacts of switch S-2 to be spaced apart so that the switch is in an electrically open, nonconducting position. S-2 is mounted in camera housing 12 such that the spring arm 258 is in the path of travel of finger 136.

In operation, the user frames his subject and focuses objective lens 56. He then presses camera start button S-1 which may be conveniently mounted on camera housing forward wall section 18b although it is not shown in the drawings. The following cycle of operation will be described by making reference to FIGS. 1, 4, 7a, 7b, 7c, and 8 of the drawings. FIG. 8 is a graphical presentation of camera functions which are actuated, controlled or performed by the single revolution sequencing gear 114.

Just prior to the user actuating switch S-1 the sequencing gear 114 is at the 0° position; film advance device 120 is in its forwardmost position; switch S-2 is in the electrically open condition; shutter 58 is latched; and the counterwheel actuating pin 180 or gear 114 is out of engagement with any tooth on the indexing ratchet wheel 182 of counter 164. The presence of the film container 30 in camera receiving chamber 28 causes the pawl arm 186 to be pivoted into engagement with the counter ratchet wheel 184.

Upon the closing of the normally opened start switch S-1, motor 66 is energized thereby rotatably driving at least the top roller 50 and the camera sequencing gear 114. Gear 114 rotates through a first 30° angular segment of the single 360° revolution causing the film advance device 120 to move rapidly, in a direction opposite of the direction of film advancement from the exposure position to the processing station, to its rearwardmost position under the influence of biasing spring 142 (see FIGS. 4 and 7b). The retraction of finger 136 closes switch S-2 and unlatches the shutter 58 which begins to open under the influence of the shutter biasing spring 238.

At the end of the initial 30° rotation, a counter actuating pin 180 on gear 114 is still not in engagement with the indexing ratchet wheel 182.

The closing of S-2 initiates the exposure phase and terminates the rotation of motor 66 thereby stopping the sequencing gear 114.

During the exposure phase, the blades 216 and 218 of shutter 58 move relative to one another in opposite directions to cause the creation of an expanding light transmitting aperture behind lens 56. The camera sequencing assembly 64 is de-activated during the exposure interval because its duration is variable. With shutter 58 open, light rays from lens 56 impinge upon the inclined mirror 62 from where they are reflected onto the forwardmost film unit to cause exposure thereof. The exposure cycle is automatically terminated by the photocell circuit which triggers the energizing of the solenoid 244. At this point the logic and power circuit 250 re-energizes motor 66 causing sequencing gear 114 to resume its rotation. After approximately the first ten degrees of resumed rotation, the counterpin 180 becomes engaged with the ratchet wheel 182. During the next 10° of rotation, the end 210 of profile cam finger 208 engages the cam follower surface 138 of film device 120.

Up to this point in the camera cycle of operation, the single revolution sequencing gear 114 has rotated through an arc segment of approximately 50° from its 0° starting position.

The counterpin 180 remains in engagement with the counterwheel 164 for approximately 35° of rotation of sequencing gear 114 thereby causing a 25° rotation of counter 184. By the time the sequencing gear 114 has gone through 75° of rotation, from the starting position the pin 180 becomes disengaged from the counter 164.

Figure 7B:
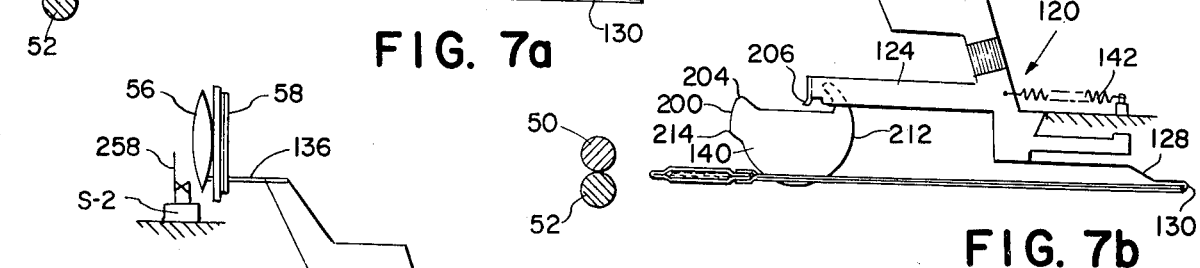
Figure 7C:
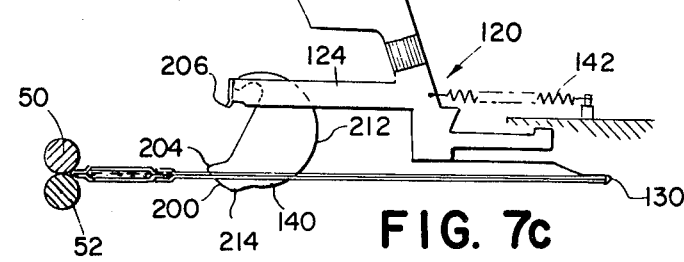

Beginning at the 50° of rotation position, the finger 210 of profile cam 140 drives the film advance member 120 forwardly from its rearwardmost position shown in FIG. 7b to the intermediate position shown in FIG. 7c for the approximately next 85° of rotation. When the film advance device 120 reaches the intermediate position, the sequencing gear 114 has undergone a total rotation of approximately 135° from the inital starting position and the film unit enters the bite of rollers 50 and 52 and shutter 58 is relatched by finger 136. Film advance device 120 is maintained at the intermediate position for approximately the next 200° of rotation of gear 114 while the film unit is advanced through rollers 50 and 52. At this point cam follower surface 138 engages the transition surface 214 of cam 140. During the next approximately 15° of rotation, the film advance device 120 is moved from its intermediate position to the forwardmost position to open switch S-2.

The illustrated and described embodiment of the sequencing system is intended to provide a vehicle for disclosing the inventive concepts of the present invention. It will be understood that certain changes may be made in the system to vary the sequence of events of a cycle of camera operation or to apply the system to camera designs that are at variance with the design described herein without exceeding the scope of the present invention.

For example, finger 136 relatches the shutter 58 when the film advance device 120 is moved forwardly to the intermediate position. This allows the solenoid 244 to be de-energized while the film unit 32 is being advanced between rollers 50 and 52 thereby reducing the drain on the battery 62 when the highest load is on motor 66. The penalty paid for this battery saving feature is a more complex and costly logic and power circuit.

If the battery-saving feature is too costly for a particular camera design, switch S-2 may be repositioned and the finger 136 may be shortened somewhat so that the shutter is not latched at the intermediate position but rather when film advance device is moved from the intermediate position to the forwardmost position to open switch S-2.

The film advance device 120 should be thought of as a movable unitary structure which has means thereon for performing a plurality of functions in a dependent relationship to the position and/or movement of the unitary structure which in turn depends on the angular disposition of a rotating member which rotates through a single revolution during the course of a cycle of operation.

The illustrated embodiment of the unitary structure performs the functions of shutter latching and unlatching, film advance, and switch operation. In a camera which does not include any electronic circuit and is driven by a spring motor or by a hand operated device, the switch operating function may be eliminated. Obviously, the other functions may be added, such as counter indexing, by adding appropriate actuating means to the unitary structure and appropriately modifying the profile of cam 140 on sequencing gear 140 so that the various functions are initiated, controlled and/or performed in response to rotating gear 140 through various angular segments of the single revolution.

Alternatively, it is not necessary to provide a unitary structure for performing several functions. It is within the scope of the present invention to provide separate actuators for shutter latching and/or switch operation that are operable for performing the functions outlined in a dependent relationship to the angular disposition of the sequencing gear 114. Also it should be understood that the various angular segments of the single revolution may be sequential and/or may overlap.

Since certain changes may be made in the above system and apparatus without departing from the scope of the invention herein involved, it is intended that all matter contained in the above description or shown in the accompanying drawings shall be interpreted as illustrative and not in a limiting sense.

What is claimed is:

1. Photographic apparatus for use in a cycle of operation which includes the exposure of a film unit, said apparatus comprising:

a housing;

means within said housing for locating a film unit in position for exposure;

exposure means for exposing a film unit located at said exposure position, said exposure means including shutter means having at least one component thereof which is movable between positions blocking and unblocking the transmission of image-bearing light through said shutter means for exposing a film unit, said at least one movable component being configured to be located in said light-blocking position at the beginning and end of a cycle of operation of said apparatus;

biasing means providing a force on said shutter means for urging said at least one movable component of said shutter means from said light-blocking position to said unblocking position;

means being selectively operable to move said at least one movable component of said shutter means from said unblocking position to said blocking position against the urging force of biasing means;

latching means being operable for latching said at least one movable component of said shutter means at said light-blocking position at the beginning and end of a cycle of operation and for unlatching said at least one movable component of said shutter means for movement between said blocking and unblocking positions during the exposure portion of a cycle of operation;

sequencing means, mounted in said housing for rotation through a single 360° revolution during the course of a cycle of operation of said apparatus, for controlling the sequence of at least some of the events comprising the cycle of operation; and means responsive to rotating said sequencing means through a first angular segment of said single revolution for causing said latching means to unlatch said at least one movable component of said shutter means located at said light-blocking position prior to exposure of a film unit and responsive to rotating said sequencing means through a second angular segment of said single revolution for causing said latching means to relatch said at least one movable component of said shutter means at said light-blocking position subsequent to exposure of the film unit.

2. Photographic apparatus as defined in claim 1 wherein said shutter means includes a pair of shutter blades each having an opening therein, said blades being mounted for movement relative to one another for moving said openings in and out of an overlapped relation with each other to configure said shutter means in said unblocking and blocking modes of operation, respectively, said at least one movable component of said shutter means includes a link mounted for pivotal motion and being connected to said pair of blades to effect the relative motion of said blades in response to pivoting said link and said means responsive to rotating said sequencing means includes movable stop means selectively positionable in and out of the path of pivotable travel of said link located at said light-blocking position for latching or unlatching said link in a dependent relationship to the angular disposition of said sequencing means.

3. Photographic apparatus as defined in claim 2 wherein said sequencing means includes a profile cam configured to rotate through said single 360° revolution and said movable stop means include a surface for following said profile cam thereby moving said movable stop means in and out of the path of travel of said pivotal link to effect the latching and unlatching of said shutter means.

4. Photographic apparatus as defined in claim 1 further including means for advancing a film unit from said exposure position subsequent to exposure, said film advancing means being operatively coupled to said sequencing means, and said latching means and said means responsive to rotating said sequencing means being an integral part of said film advancing means.

5. Photographic apparatus as defined in claim 1 further including means for driving said sequencing means through said single 360° revolution during the course of a photographic cycle of operation.

6. Photographic apparatus as defined in claim 5 wherein said drive means includes a motor and means operatively connecting said motor and said sequencing means.

7. Photographic apparatus for exposing and processing a film unit of the self-developing type during the course of a cycle of operation of said apparatus, said apparatus comprising:
a housing;
means within said housing for locating such a film unit in position for exposure;
exposure means, including shutter means, for exposing such a film unit located at said exposure position, said shutter means including means movable between positions blocking and unblocking the transmission of image-bearing light through said shutter means to effect the exposure of the film unit;
a processing station within said housing for applying a compressive pressure to such a film unit, subsequent to exposure, for distributing a fluid processing composition within the film unit;
film advance means, mounted for movement within said housing, for engaging such a film unit located at said exposure position and advancing the film unit to said processing station subsequent to exposure;
shutter latching means on said film advance means and movable therewith for initially latching said shutter means in said light-blocking position, for unlatching said shutter means to allow said shutter means to move between said blocking and unblocking positions to effect the exposure of such a film unit, and for relatching said shutter means in said light-blocking position subsequent to exposure; and
sequencing means for controlling the sequence of certain events in said cycle of operation of said apparatus including latching and unlatching of said shutter means and advancing such a film unit from said exposure position to said processing station, said sequencing means including a sequencing member mounted in said housing for rotation through a single 360° revolution during the course of a cycle of operation of said apparatus, said sequencing member being coupled to said film advance means such that position of said film advance means relative to a film unit at said exposure position and the position of said shutter latching means on said film advance means relative to said shutter means is determined by the angular disposition of said sequencing member relative to an initial predetermined starting position of said sequencing member at the beginning of a cycle of operation wherein said sequencing member locates said film advance means in a first position such that said shutter latching means thereon engages and latches said shutter means in said light-blocking position, said film advance means being movable from said first position to a second position, in response to rotating said sequencing member through a first angular segment of said single revolution, causing said shutter latching means to become disengaged from and thereby unlatching said shutter means and locating said firm advance means in position to engage such a film unit located at said exposure position, said film advance means being movable between said second position and said first position, in response to rotating said sequencing member through a second angular segment of said single revolution, for advancing the film unit from said exposure position to said processing station and for causing said shutter latching means to re-engage and relatch said shutter means in said light-blocking position.

8. Photographic apparatus as defined in claim 7 wherein said film advance means is movable from said second position to a third position, intermediate said first and second positions, for advancing a film unit from said exposure position to said processing station in response to rotating said sequencing member through a portion of said second angular segment of said one revolution and is movable from said third position to said first position in response to rotating said sequencing member through the remaining portion of said second angular segment of said single revolution for causing said shutter latching means to re-engage and relatch said shutter means in said light-blocking position.

9. Photographic apparatus as defined in claim 7 wherein said film advance means is movable from said second position to a third position, intermediate said first and second positions, in response to rotating said sequencing member through a portion of said second angular segment of said one revolution for advancing a film unit from said exposure position to said processing station and for causing said shutter latching means to re-engage and relatch said shutter means in said light-blocking position.

10. Photographic apparatus as defined in claim 9 further including electrical circuit means for controlling certain events in a cycle of operation of said apparatus, said circuit means including electrical switch means movable between electrically conducting and nonconducting states, said apparatus further including switch actuating means on said film advance means and being movable therewith for engaging and locating said switch means in one of said two states when said film advance means is located in said first position and for becoming disengaged from said switch means to locate said switch means in the other of said two states when said film advance means is located in a position other than said first position, said film advance means being movable from said third position to said first position, in response to rotating said sequencing member through the remaining portion of said second angular segment of said one revolution, for locating said switch actuating means in engagement with said switch means.

11. Photographic apparatus as defined in claim 7 wherein said film advance means moves from said first to said second position in a direction that is opposite the direction of advancement of the film unit from said exposure position to said processing station and said film advance means moves from said second position to said first position in a direction that is the same as the direction of advancement of the film unit from said exposure position to said processing station.

12. Photographic apparatus as defined in claim 7 wherein such a film unit has a leading end and a trailing end and said processing station is located adjacent to the leading end of a film unit located in said exposure position and said film advance means is configured to engage the trailing end of said film unit to advance the film unit, leading end first, to said processing station in response to movement of said film advance means from said second position toward said first position.

13. Photographic apparatus as defined in claim 7 further including biasing means providing a force on said film advance means for moving said film advance means in one direction and said sequencing member includes a profile cam thereon that is selectively engageable with a cam follower means on said film advance means for advancing said film advance means in a direction that is opposite said one direction against the force of said biasing means and is selectively disengageable from said cam follower means during the course of said single revolution to allow said biasing means to move said film advance means in said one direction.

14. Photographic apparatus as defined in claim 13 wherein said one direction of said film advance means movement is opposite the direction of film unit advancement from said exposure position to said processing station and said opposite direction of film advance means movement is in a direction that is the same as the direction of film unit advancement from said exposure position to said processing station.

15. Photographic apparatus as defined in claim 7 further including drive means for driving said sequencing member through said single 360° revolution during the course of a cycle of operation of said apparatus.

16. Photographic apparatus as defined in claim 15 wherein said drive means includes a motor and a gear train coupling said motor to said sequencing member for rotatably driving said sequencing member through said single 360° revolution.

17. Photographic apparatus as defined in claim 16 wherein said processing station included a pair of juxtaposed rotatably mounted rollers through which such a film unit is to be advanced to apply a compressive pressure thereto and at least one of said pair of rollers is coupled to said gear train such that said at least one roller is rotatably driven in a direction to cause the film to advance between said rollers.

18. Photographic apparatus as defined in claim 16 wherein said motor is an electrically powered motor and said apparatus further includes circuit means for controlling certain functions in said cycle of operation including selectively energizing and de-energizing said motor, said circuit means including switch means movable between conducting and nonconducting states and said apparatus further includes switch actuating means on said film advance means for engaging said switch means to configure said switch means in one of said two states when said film advance means is located in said first position and for becoming disengaged from said switch means when said film advance means is located in a position other than said first position to configure said switch means in the other of said two states.

19. Photographic apparatus as defined in claim 7 further including means for receiving and holding a plurality of such film units in said housing for sequential exposure and processing, counter means for counting and visually displaying indicia representing member of film units exposed and processed or the number of film units remaining to be exposed and processed, and means responsive to rotating said sequencing member through a predetermined angular segment of said single revolution for indexing said counter means one indicia during the course of a cycle of operation of said apparatus.

20. Photographic apparatus for exposing and processing a self-developing film unit during the course of a cycle of operation of said apparatus, said apparatus comprising:
a housing;
means within said housing for locating such a film unit in position for exposure;
exposure means, including shutter means, for exposing a film unit located at said exposure position said shutter means including means movable between positions blocking and unblocking the transmission of image-bearing light through said shutter means to effect the exposure of the film unit, said shutter means also being configured to be latched in said light-blocking position at the beginning and end of a cycle of operation of said apparatus;
a processing station including pressure applying means for applying a compressive pressure to such a film unit subsequent to exposure for distributing a fluid processing composition within the film unit;
sequencing means for controlling the sequence of certain events in a cycle of operation of said apparatus, said sequencing means including a member mounted for rotation through a single 360° revolution during the course of a cycle of operation of said apparatus;
means responsive to rotating said sequencing member through a first angular segment of said single revolution for unlatching said shutter means located in said light-blocking position to allow said shutter means to move between said blocking and unblocking positions to effect the exposure of such a film unit located at said exposure position;
means responsive to rotating said sequencing member through a second angular segment of said single revolution for advancing such a film unit, subsequent to exposure, from said exposure position to said processing station;

counting means, responsive to rotating said sequencing member through a third angular segment of said single revolution, for counting and visually indicating the number of cycles of operation of said apparatus; and means responsive to rotating said sequencing member through a fourth angular segment of said single revolution for relatching said shutter means in said light-blocking position subsequent to exposure of such a film unit.

21. Photographic apparatus as defined in claim 20 wherein said second and fourth angular segments of said one revolution are coextensive.

22. Photographic apparatus as defined in claim 20 wherein said means for unlatching and relatching said shutter means includes a single structural element.

23. Photographic apparatus as defined in claim 20 wherein said means for advancing the film unit and said means for latching and unlatching said shutter means are embodied in a unitary structure.

24. Photographic apparatus as defined in claim 23 wherein said unitary structure is mounted for movement from a first position wherein said shutter means is latched to a second position wherein said shutter means is unlatched and said unitary structure is positioned to engage a film unit located at said exposure position, and from said second position to a third position for advancing the film unit from said exposure position to said processing station.

25. Photographic apparatus as defined in claim 24 wherein said unitary structure relatches said shutter means when located in said third position.

26. Photographic apparatus as defined in claim 24 wherein said unitary structure is movable from said third position to said first position to relatch said shutter means.

27. Photographic apparatus as defined in claim 24 wherein said third position of said unitary structure is intermediate said first and second positions thereof.

28. Photographic apparatus as defined in claim 24 wherein said sequencing member includes a cam thereon being rotatable therewith and said unitary structure includes cam follower means thereon for operatively connecting said sequencing member to said unitary structure so that said position of said unitary structure is changeable in response to rotation of said cam on said sequencing member.

29. Photographic apparatus as defined in claim 20 wherein said sequencing member has counter actuating means thereon for actuating said counter means one time during the course of said single revolution.

30. Photographic apparatus as defined in claim 24 further including electrical circuit means for controlling certain events in a cycle of operations of said apparatus, said circuit means including switch means movable between electrically conducting and nonconducting states and said unitary structure further includes switch actuating means for locating said switch means in one of said two states when said unitary structure is located in said first position and for locating said switch means in the other of said two states when said unitary structure is located in a position other than said first position.

31. Photographic apparatus as defined in claim 20 wherein said sequencing member includes a sequencing gear and said apparatus includes a motor and a gear train coupled between said motor and sequencing gear for driving said sequencing gear.

32. Photographic apparatus for exposing and processing a film unit of the self-developing type during the course of a cycle of operation of said apparatus, said apparatus comprising:

a housing;

means within said housing for locating such a film unit in position for exposure;

exposure means, including shutter means, for exposing such a film unit, said shutter means including means movable between positions blocking and unblocking transmission of image-bearing light through said shutter means, said shutter means being configured to be latched in said light-blocking position at the beginning and end of a cycle of operation of said apparatus;

a processing station for applying a compressive pressure to such a film unit, subsequent to exposure, for distributing a fluid processing composition within said film unit;

film advance means mounted for movement for engaging and advancing such a film unit from said exposure position to said processing station; and shutter latch means on said film advance means for latching and unlatching said shutter means located in said light-blocking position;

said film advance means being movable from a first position, wherein said shutter latching means engages and latches said shutter in said light-blocking position, to a second position for causing said shutter latching means to become disengaged from said shutter means to allow said shutter means to move between said blocking and unblocking positions and for locating said film advance means in position to engage such a film unit located at said exposure position, said film advance means being movable between said second position and said first position for advancing the film unit from said exposure position to said processing station and for locating said shutter latching means in position to relatch said shutter means in said light-blocking position.

33. Photographic apparatus as defined in claim 32 wherein said shutter latching means relatches said shutter in said light-blocking position when said film advance means is located in a third position intermediate said second and first positions.

34. Photographic apparatus as defined in claim 33 further including electrical circuit means for controlling certain events in the cycle of operation of said apparatus, said circuit means including switch means movable between electrically conducting and nonconducting states, said film advance means further including switch actuating means thereon for engaging and locating said switch means in one of said two states when said film advance means is in said first position and for becoming disengaged from and locating said switch means in the other of said two states when said film advance means is located in a position other than said first position.

35. Photographic apparatus as defined in claim 34 wherein said film advance means is movable from said first position to said second position in a direction that is opposite the direction of film advancement from said exposure position to said processing station and is movable from said second position to said first position in a direction that is the same as the direction of film advancement from said exposure position to said processing station.

36. Photographic apparatus for exposing and processing a film unit of self-developing type during the course of a cycle of operation of said apparatus, said apparatus comprising;

a housing;

means within said housing for receiving a film container holding a plurality of such film units in stacked relationship therein and supporting such a film container in a manner to locate a forwardmost film unit in the container in position for exposure;

exposure means, including shutter means, for exposing such a film unit located at said exposure position, said shutter means including means movable between positions blocking and unblocking the transmission of image-bearing light through said shutter means to effect the exposure of the film unit, said shutter means also being configured to be latched in said light-blocking position at the beginning and end of a cycle of operation of said apparatus;

a processing station, including a pair of rollers, through which such a film unit is to be advanced, subsequent to exposure, for applying a compressive pressure to the film unit to distribute a fluid processing composition within the film unit;

electrical circuit means for controlling certain events in a cycle of operation of said apparatus, said circuit means including switch means being movable between an electrically conducting state for connecting a source of electrical energy to said circuit means and a nonconducting state for disconnecting such a source of electrical energy from said circuit means;

film counter means having indicia thereon representing the number of film units remaining in such a film container and being actuable to index one indicia for each cycle of operation of said apparatus;

a unitary structure being mounted for movement between a first position, a second position and a third position, intermediate said first and second positions, and including means thereon for advancing a film unit from said exposure position to said processing station, means for latching and unlatching said shutter means, and means for operating said switch means, said unitary structure being configured such that said shutter latching means engages and latches said shutter means in said light-blocking position and said switch operating means engages and locates said switch means in said nonconducting state when said unitary structure is located in said first position, said unitary structure being movable from said first position to said second position causing said shutter latch means and said switch operating means to become disengaged from said shutter means and switch means, respectively, to unlatch said shutter means and locate said switch means in said conducting state and for locating said film advance means in position to engage the forwardmost film unit in the film container, said unitary structure being movable from said second position to said third position, subsequent to exposure of the forwardmost film unit, causing said film advance means to advance the forwardmost film unit from said exposure position to said processing station and causing said shutter latching means to relatch said shutter means, said unitary structure being movable from said third position to said first position for causing said switch operating means to locate said switch means in said nonconducting state;

sequencing means for controlling certain events in a cycle of operation of said apparatus including moving said unitary structure and indexing said counter means, said sequencing means including a sequencing gear mounted for rotation through a single 360° revolution during the course of a cycle of operation of said apparatus and having a profile cam thereon being selectively engageable with said unitary structure for locating said unitary structure in said first, second, and third positions in a dependent relationship with the angular disposition of said sequencing member relative to a predetermined starting position at the beginning of a cycle of operation, said sequencing gear also having a counter actuating means thereon being selectively engageable with said counter means for indexing said counter means one indicia during the course of a single revolution of said sequencing gear; and drive means for rotatably driving said sequencing gear and at least one of said pair of rollers to cause a film unit to be advanced between said pair of rollers, said drive means including a motor and a gear train coupling said sequencing gear and said at least one roller to said motor;

said cam on said sequencing gear having a shaped profile for locating said unitary structure in said first position when said sequencing gear is located at said predetermined starting position at the initiation of a cycle of operation whereby said shutter means is latched and said switching means is located in said nonconducting state, in response to rotating said sequencing gear through a first angular segment of said single revolution, said cam causes said unitary structure to move from said first position to said second position thereby unlatching said shutter means and locating said switch means in said conducting state and locating said film advance means in position to engage the forwardmost film unit in the film container, following exposure of the forwardmost film unit and in response to rotating said sequencing gear through a second angular segment of said single revolution, said counter actuating means indexes said counter means and said cam causes said unitary structure to move from said second position to said third position thereby advancing the forwardmost film unit from said exposure position to said processing station and locating said shutter latching means in position to relatch said shutter means, said cam further causing said unitary structure to move from said third position to said first position, in response to rotating said sequencing gear through a third angular segment of said single revolution, causing said switch operating means to locate said switch means in said nonconducting state thereby terminating said cycle of operation.

37. Photographic apparatus for exposing and processing a self-developing film unit during the course of a cycle of operation of said apparatus, said apparatus comprising:

a housing;

means for locating such a film unit within said housing in position for exposure;

exposure means for exposing such a film unit located at said exposure position, said exposure means including shutter means movable between positions blocking and unblocking the transmission of image-bearing light therethrough, said shutter means being configured to be latched in said light blocking position prior and subsequent to the exposure of a film unit located at said exposure position;

a processing station including means for applying a compression pressure to such a film unit, subsequent to exposure, for distributing a fluid processing composition within the film unit;

an electrical circuit for controlling certain events in a cycle of operation of said apparatus and including electrical switch means movable between electrically conducting and nonconducting positions;

sequencing means cooperating with said electrical circuit for controlling certain other events in a cycle of operation of said apparatus and including a sequencing member mounted for rotation through a single 360° revolution relative to a predetermined starting position during the course of a cycle of operation of said apparatus;

means responsive to the angular disposition of said sequencing member relative to said starting position and responsive to rotation of said sequencing member for latching said shutter means in said light blocking position prior to exposure of such a film unit, for unlatching said shutter means for movement between said light blocking and unblocking position to cause exposure of the film unit and for relatching said shutter means in said light blocking position subsequent to exposure of the film unit;

means responsive to the angular disposition of said sequencing member relative to said starting position and responsive to rotation of said sequencing member for selectively moving said electrical switch means between said electrically conducting and nonconducting positions during the course of a cycle of operation of said apparatus; and film advance means responsive to the angular disposition of said sequencing member relative to said starting position and responsive to rotation of said sequencing member for advancing a film unit from said exposure position to said processing station subsequent to exposure of the film unit.

38. Photographic apparatus as defined in claim 37 wherein said means for latching and unlatching said shutter means and said means for moving said electrical switch means are embodied in a unitary structure.

39. A photographic camera operable in a cycle comprising a plurality of events performed in a predetermined sequence and relating to the production of a viewable image of a scene on a photographic sheet, said camera comprising:

an electric motor;

a rotatably mounted sequencing wheel arranged to be driven by said motor, said sequencing wheel including a cam surface;

sliding means including a cam follower, disposed in operable relationship with said cam surface, and an actuating member;

means for guiding said sliding means along a predetermined path;

an electrical circuit, including a switch arranged to selectively connect said electrical circuit to a source of electrical energy, operable to control the performance of certain events in the cycle, said electrical circuit controlling the energization of said motor to cause said sequencing wheel to rotate substantially 360° during each cycle, said sliding means being configured so that its actuating member selectively contacts said switch to assume a first state at the beginning of each cycle, to cause said switch to assume a second state during the course of each cycle, and to cause said switch to return to its said first state just prior to or at the completion of each cycle; and means for continually urging said sliding means towards a first position along said guide means wherein said actuating member is disposed out of contact with said switch and wherein said motor is arranged to drive said sliding means into a second position along said guide means, against the force of said urging means, said actuating member being in contact with said switch when in its said second position, said cam surface being configured to retain said sliding means in its said second position against the force of said urging means upon deenergization of said motor.

40. The photographic camera of claim 39 wherein said first state of said switch is open, said second state of said switch is closed and said electric circuit is arranged to automatically deenergize said motor when said motor causes said actuating member to change the state of said switch just prior to or at the completion of each said cycle.

41. The photographic camera of claim 39 additionally including:

means for locating a film unit in position for exposure;

shutter means mounted for displacement between a first arrangement wherein it is operative to preclude scene light from exposing the film unit and another arrangement wherein it permits scene light to expose the film unit;

means for urging said shutter means towards it said other arrangement to initiate an exposure cycle;

electrically energizable means for displacing said shutter means from its said other arrangement into its said first arrangement against the influence of said urging means to terminate an exposure cycle; and a shutter latch mounted on said sliding means, said sliding means being configured for displacing said shutter latch from a position wherein it does not latch said shutter means into a position wherein it latches said shutter means, located in said first arrangement, as said sliding means is displaced along said guiding means.

42. The photographic camera of claim 41 wherein said cam surface is configured to retain said sliding means in a position when said electrical motor is deenergized.

43. The photographic camera of claim 39 additionally including:

means for defining a film plane at which a film unit having a photosensitive layer and a pod of processing fluid may be positioned for selective exposure;

a processing station for applying a compressive force to the film unit after its exposure to effect the distribution of its processing fluid from its pod over its exposed photosensitive layer; and a film advancing member connected to said sliding means to move therewith to advance the film unit from its exposure position into said processing station following exposure of the film unit and during the cycle.

44. A photographic camera operable in a cycle comprising a plurality of events performed in a predetermined sequence and relating to the production of a viewable image of a scene on a photographic sheet, said camera comprising:

means for defining a film plane at which a film unit having a photosensitive layer and a pod of processing fluid may be positioned for selective exposure;
a shutter for selectively exposing the film unit;
a pair of fluid spreading rollers;
an electrical motor coupled to at least one of said pair of rollers;
a rotatably mounted sequencing wheel arranged to be driven by said motor, said sequencing wheel including a cam surface;
sliding means including a cam follower, disposed in operable relationship with said cam surface, and a film advancing member;
means for guiding said sliding means along a predetermined path extending generally parallel to said film plane; and
spring means for continually urging said sliding means and its film advancing member in a direction along said predetermined path away from said rollers;
said cam surface being configured to retain said sliding means and its said film advancing member in a forward position along said predetermined path in the direction of said rollers prior to the commencement of said cycle, to permit said spring means to displace said sliding means and its film advancing member to a rearward position along said predetermined path away from said rollers wherein said film advancing member may engage the end of said film unit furthermost disposed from said rollers during the cycle, and to subsequently cause said sliding means and its said film advancing member to move forward along said predetermined path after the actuation of said shutter means and prior to the completion of the cycle to advance said film unit into operative relationship with said rollers.

45. The photographic camera of claim 44 wherein said cam surface is further configured to cause said sliding means and its said film advancing member to remain in a forward position along said predetermined path in the direction of said rollers during the portion of the cycle that said fluid spreading rollers operate against the exposed film unit to effect its advancement therebetween and to retain said sliding means and its said film advancing member in the forward position along said predetermined path in the direction of said rollers against the force of said spring means at the termination of said cycle.

46. The photographic camera of claim 44 wherein said shutter means is mounted for displacement between a first arrangement wherein it is operative to preclude scene light from exposing the film unit and another arrangement wherein it permits scene light to expose the film unit and additionally including:
means for urging said shutter means towards its said other arrangement to initiate an exposure operation.
electrically energizable means for displacing said shutter means from its said other arrangement into its said first arrangement against the influence of said means for urging said shutter means to terminate an exposure operation;
a shutter latch attached to said sliding means;
means for urging said sliding means and its said shutter latch into a position wherein said shutter latch does not latch said shutter means; and
electrically energizable means for displacing said sliding means and its said shutter latch from said shutter means unlatching position into a position wherein it serves to latch said shutter means, said sliding means and its shutter latch displacing means being operative against the influence of said sliding means and its shutter latch urging means when said shutter means is in its first arrangement.

47. A photographic apparatus comprising:
means responsive to electrical energization for automatically performing a plurality of events in a predetermined sequence to effect a predetermined photographic cycle including the exposure of a film unit to scene light, said events performing means including at least one displaceably mounted member and means for effecting a displacement of said member from an initial position into a second position to facilitate the performance of one of said events other than the last of said events and for returning said member to its said initial position incident to the performance of said last event;
a manually accessible normally nonconductive first switch for selectively electrically coupling said events performing means to a source of electrical energy to initiate said photographic cycle upon manual actuation by an operator, said first switch being of the type which is automatically returnable to the nonconductive state upon manual actuation and release thereof by the operator;
a normally nonconductive second switch for selectively electrically coupling said events performing means to a source of electrical energy, said member being operative to render said second switch conductive when it moves from its said initial position into its said second position, and to render said second switch again nonconductive when it returns to its said initial position incident to the performance of said last event, said one event being sequenced to occur prior to the automatic return of said first switch to its nonconductive condition following a normally anticipated manual actuation and release of said first switch by an operator.

48. The photographic apparatus of claim 47 wherein said events performing means additionally includes means for applying pressure to the film unit subsequent to the exposure thereof, said displaceably mounted member operating to advance such a film unit from its exposure position subsequent to the exposure thereof into the operative influence of said pressure applying means as said member moves from its said second position back to its said initial position in the course of said predetermined sequence of events.

49. The photographic apparatus of claim 47 wherein said events performing means additionally includes a shutter, and said displaceably mounted member facilitates the latching of said shutter when said member is in its said initial position and the unlatching of said shutter when said member moves from its said initial position.

50. A photographic camera comprising:
means for locating a film unit in position for exposure;
a shutter mounted for displacement between a first arrangement wherein it is operative to preclude scene light from exposing the film unit and another arrangement wherein it permits scene light to expose the film unit;
means for urging said shutter towards its said other arrangement to initiate an exposure cycle;

electrically energizeable means for displacing said shutter from its said other arrangement into its said first arrangement against the influence of said urging means to thereby terminate an exposure cycle;

a shutter latch;

means for urging said shutter latch into a position where it does not latch said shutter;

electrically energizable means for displacing said shutter latch from its said shutter unlatching position into a position wherein it serves to latch said shutter, said shutter latch displacing means being operative against the influence of said shutter latch urging means, said shutter latch displacing means comprising a slider including a cam follower, said shutter latch being mounted on said slider, means for guiding said slider along a predetermined path, an electric motor, a displaceably mounted camming surface operatively positioned with respect to said cam follower, and means for coupling said motor to said camming surface such that displacement of said camming surface under the influence of said motor controls the movement of said slider along said guiding means to effect the selective unlatching and latching of said shutter by said shutter latch; and motor control means for controlling said motor to position said slider so as to cause said shutter latch to be in its shutter latching position upon the completion of an exposure cycle and prior to the deenergization of said shutter displacing means.

51. A photographic camera comprising:

means for locating a film unit in position for exposure;

a shutter mounted for displacement between a first arrangement wherein it is operative to preclude scene light from exposing the film unit and another arrangement wherein it permits scene light to expose the film unit;

means for continually urging said shutter towards its said other arrangement to initiate an exposure cycle;

electrically energizable means for displacing said shutter from its said other arrangement into its said first arrangement against the influence of said urging means to thereby terminate an exposure cycle;

a shutter latch;

means for urging said latch into a position where it does not latch said shutter; and electrically energizeable means for displacing said latch from its said shutter unlatching position into a position wherein it serves to latch said shutter, said latch displacing means being operative against the influence of said latch urging means, said latch displacing means additionally including means for retaining said latch in its said latching position against the influence of said latch urging means when said means for displacing said shutter and said means for displacing said latch are deenergized.

52. A photographic camera automatically operable through a plurality of events forming a predetermined cycle, said camera comprising:

a housing;

a lens for directing and focusing image carrying rays from a photographic scene to a given focal plane within said housing;

a shutter mechanism electrically operable between a blocking arrangement wherein said rays are precluded from reaching said focal plane and an unblocking arrangement wherein said rays are transmitted to said focal plane;

film advancing means actuable for advancing photographic film material from a focal position in said focal plane;

a latch displaceable between a latching position wherein said latch is configured for latching engagement with said shutter mechanism and an unlatch position wherein said latch is disengaged from said shutter mechanism;

drive means energizable for automatically first actuating said film advancing means and subsequently displacing said latch from its said unlatch position to its said latching position;

a control circuit energizable for controlling said shutter mechanism and said drive means to operate said shutter mechanism, said film advancing means, and said latch in said predetermined cycle to first expose film material located in a focal position in said focal plane and thereafter energize said drive means to advance said film material from said focal position and return said latch to its said latching position;

a switch arrangement actuable between a first state for coupling said control means to a source of voltage, and a second state for decoupling said control means from said voltage source; and means for mounting said switch in operative relation to said latch so that movement of said latch from its said latching position to its said unlatch position alters said switch from its said first state to its said second state whereby said displacement of said latch from its said latching position initiates camera operation by energizing said controlling means through said switch to carry out said predetermined cycle including energization of said drive means to advance said film material and then return said latch to its said latching position so as to decouple said control means from said source and thereby terminate camera operation.

* * * * *